US009218111B2

(12) United States Patent
Kawai et al.

(10) Patent No.: US 9,218,111 B2
(45) Date of Patent: Dec. 22, 2015

(54) IMAGE PROCESSING DEVICE FOR DISPLAYING CONTENT, CONTENT CREATION DEVICE, AND IMAGE PROCESSING METHOD

(71) Applicant: SONY COMPUTER ENTERTAINMENT INC., Tokyo (JP)

(72) Inventors: Aritoki Kawai, Tokyo (JP); Takayuki Shinohara, Tokyo (JP); Hidehiko Morisada, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 388 days.

(21) Appl. No.: 13/798,516

(22) Filed: Mar. 13, 2013

(65) Prior Publication Data
US 2013/0198686 A1 Aug. 1, 2013

Related U.S. Application Data

(63) Continuation of application No. PCT/JP2011/005120, filed on Sep. 12, 2011.

(30) Foreign Application Priority Data

Sep. 15, 2010 (JP) ................................. 2010-207127

(51) Int. Cl.
G06F 17/10 (2006.01)
G06F 3/0484 (2013.01)
G06F 3/048 (2013.01)

(52) U.S. Cl.
CPC ............ *G06F 3/04842* (2013.01); *G06F 3/048* (2013.01)

(58) Field of Classification Search
None
See application file for complete search history.

(56) References Cited

U.S. PATENT DOCUMENTS 6,563,999 B1 5/2003 Suzuoki
6,650,343 B1 11/2003 Fujita et al.
(Continued)

FOREIGN PATENT DOCUMENTS

CN 101356493 1/2009
JP 2009-500884 1/2009
(Continued)

OTHER PUBLICATIONS

ActiveNetwork, Adobe Acrobat 9 PRO, Sep. 18, 2008, Activenetwork, pp. 1-7.*
(Continued)

*Primary Examiner* — Boris Pesin
*Assistant Examiner* — Justin Lee
(74) *Attorney, Agent, or Firm* — Katten Muchin Rosenman LLP

(57) ABSTRACT

When the user enters a request for moving a viewpoint, whether or not a displayed area is encompassed in a link area that is set for an active image is kept monitored. When the displayed area is encompassed, a corresponding link is determined to be valid, and an image of a link destination mapped to the link area is displayed. Whether or not the displayed area moves outside of a link area set for an image of a link origin is further monitored. If even a part of the displayed area moves outside of the link area, a corresponding link is determined to be invalid, and the display is switched back to the image of the link origin. If none of the above-stated conditions applies, the initial image continues to be displayed while moving the displayed area according to the movement of the viewpoint within the active image.

14 Claims, 12 Drawing Sheets

(56) References Cited

U.S. PATENT DOCUMENTS

| | | | |
|---|---|---|---|
| 8,106,856 B2 | 1/2012 | Matas et al. | |
| 8,239,783 B2* | 8/2012 | Fong et al. | 715/784 |
| 8,305,355 B2 | 11/2012 | Matas et al. | |
| 2003/0179231 A1 | 9/2003 | Kamiwada et al. | |
| 2007/0016868 A1* | 1/2007 | Nurmi | 715/738 |
| 2008/0052945 A1* | 3/2008 | Matas et al. | 34/173 |
| 2008/0187248 A1* | 8/2008 | Ikeda et al. | 382/305 |
| 2009/0278916 A1* | 11/2009 | Ito | 348/51 |
| 2010/0115550 A1* | 5/2010 | Minnick et al. | 725/37 |
| 2011/0273470 A1* | 11/2011 | Ohba et al. | 345/619 |
| 2012/0105489 A1* | 5/2012 | Monroe et al. | 345/684 |
| 2012/0127207 A1 | 5/2012 | Matas et al. | |
| 2013/0061175 A1 | 3/2013 | Matas et al. | |
| 2013/0212531 A1* | 8/2013 | Yoshida | 715/829 |

FOREIGN PATENT DOCUMENTS

| | | |
|---|---|---|
| JP | 2010-503082 | 1/2010 |
| WO | 2007/003687 | 1/2007 |
| WO | 2010/055604 | 5/2010 |

OTHER PUBLICATIONS

International Search Report dated Oct. 4, 2011, from corresponding International Application No. PCT/JP2011/005120.

International Preliminary Report on Patentability and Written Opinion of the International Searching Authority dated Apr. 9, 2013 from corresponding International Application No. PCT/JP2011/005120.

Chinese First Office Action dated Mar. 30, 2015 from corresponding Application No. 201180044181.2.

* cited by examiner

IMAGE PROCESSING DEVICE FOR DISPLAYING CONTENT, CONTENT CREATION DEVICE, AND IMAGE PROCESSING METHOD

BACKGROUND OF THE INVENTION

1. Field of the Invention

The present invention relates to an image processing technology for receiving a viewpoint movement for a display image.

2. Description of the Related Art

Home entertainment systems are proposed that are capable of reproducing moving images as well as running game programs. In the home entertainment systems, a generates three-dimensional images using polygons (see, e.g., U.S. Pat. No. 6,563,999).

In addition to three-dimensional images of games, etc., it has become easy to acquire textual information and image information of various types of content such as web page images, books, magazines, newspapers, advertisements, etc., with the growing use of networks. Regardless of the size of a device such as a personal computer, a mobile terminal, or the like, viewing of high-quality images has become possible, and image processing technologies have become essential in everyday life.

As image processing technologies become familiar, there caused a tendency toward the complication of images displayed as content and further more the structure of information shown by the images and toward the expansion of a data size. Under such a situation, it is possible that content becomes difficult to access information desired by the user and that it takes time to create and/or revising content. Therefore, it is desired to achieve content that allows for efficient access to desired information regardless of the contents.

3. Related Art List

U.S. Pat. No. 6,563,999

SUMMARY OF THE INVENTION

In this background, a purpose of the present invention is to provide a technology for creating and displaying content that allows for efficient access to desired information.

MEANS TO SOLVE THE PROBLEM

One embodiment of the present invention relates to an image processing device. The image processing device is an image processing device to display an image with moving a displayed area in the image according to user operation and comprises: a content memory unit configured to store data of a plurality of images to be displayed and a link setting file that is respectively set for each image to achieve a link function of switching display of a single image being displayed to another image when an inclusion relationship between the displayed area and a specific link area satisfies a predetermined requirement, the link setting file describing information regarding the link area and identification information of a link destination image; a link processing unit configured to determine whether or not an inclusion relationship with a link area set for a current image being displayed satisfies the predetermined requirement by a movement of the displayed area in the current image; and a display image processing unit configured to switch an image to be displayed to the link destination image by performing a rendering process of rendering image data of the link destination image based on the identification information of the link destination image when it is determined by the link processing unit that the predetermined requirement has been satisfied, wherein the link processing unit further continues to monitor an inclusion relationship between a link area that is set for an image displayed before a switching to the image being displayed and the displayed area in the image being displayed to determine whether or not the inclusion relationship no longer satisfies the predetermined requirement, and wherein the display image processing unit further switches the image to be displayed back to the image displayed before the switching when the link processing unit determines that the predetermined requirement is no longer satisfied.

Another embodiment of the present invention relates to a content creation device. The content creation device comprises: an image data generation unit configured to generate a plurality of items of image data; a link adjustment unit configured to adjust and set a specific link area for each image to achieve a link function of switching display of a single image being displayed to another image, in an image processing device for display an image with moving a displayed area in the image according to user operation when the displayed area is encompassed in the specific link area, such that an area in which a link area that is set to a first image and that links to a second image and a link area that is set to the second image and that links to the first image overlap with each other is set to be a size that does not allow the displayed area to be encompassed, while the first image and the second image are arranged one after the other in a virtual sequence of images expressed by a link; and a content file output unit configured to output a content file that maps the image data to a link setting file in which information regarding the link area and identification information of a link destination image are described.

Yet another embodiment of the present invention relates to an image processing method. This image processing method is an image processing method to display an image with moving a displayed area in the image according to user operation and comprises: reading out, from a memory device, a content file that maps data of a plurality of images to be displayed to a link setting file that is set for each image to achieve a link function of switching display of a single image being displayed to another image when an inclusion relationship between the displayed area and a specific link area satisfies a predetermined requirement, the link setting file describing information regarding the link area and identification information of a link destination image; switching, when an inclusion relationship with a link area set for a current image being displayed satisfies the predetermined requirement by a movement of the displayed area in the current image, an image to be displayed to a link destination image by performing a rendering process of rendering image data of the link destination image based on the identification information of the link destination image; and continuing to monitor an inclusion relationship between a link area that is set for an image displayed before a switching to the image being displayed and the displayed area in the image being displayed and switching back to the image displayed before the switching when the inclusion relationship no longer satisfies the predetermined requirement.

Yet another embodiment of the present invention relates to a data structure for a content file. The data structure is a data structure for a content file processed in an image processing device to display an image with moving a displayed area in the image according to user operation, the data structure mapping the following to each other: data of a plurality of images to be displayed; and a link setting file describing a link area and identification information of a link destination image, the link area: being a specific link area set for each image to achieve a link function of switching display of a single image being displayed to another image when the displayed area is encompassed in the specific link area; and being set such that an area in which a link area that is set to a first image and that links to a second image and a link area that is set to the second image and that links to the first image overlap with each other is set to be a size that does not allow the displayed area to be encompassed, while the first image and the second image are arranged one after the other in a virtual sequence of images expressed by a link.

Optional combinations of the aforementioned constituting elements, and implementations of the invention in the form of methods, apparatuses, systems, computer programs, and recording media recording computer programs may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
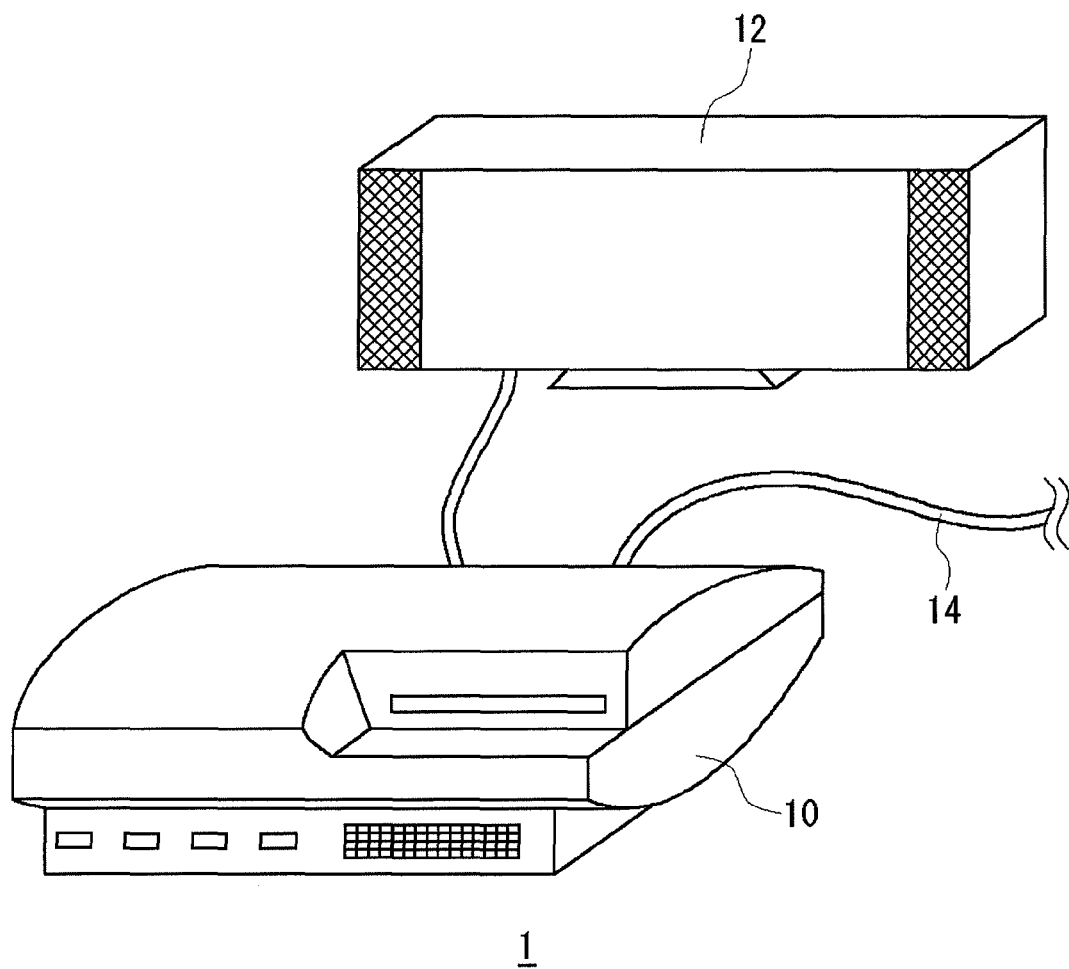
FIG. 1 is a diagram illustrating an environment in which an image processing system that can be applied in the embodiment is used.

In the present embodiment, content that displays visual information such as books, newspapers, magazines, game images, menu display images, web page images, maps, photos, paintings, advertisements, etc., is to be processed. A display purpose thereof and a function that is achieved in later paragraphs are nonrestrictive. FIG. 1 illustrates an environment in which an image processing system that can be applied in the present embodiment is used. An image processing system 1 comprises an image processing device 10 for executing software for image processing and a display device 12 for outputting a result of processing by the image processing device 10. The display device 12 may be a television set that has a display for outputting an image and a speaker for outputting sound.

The display device 12 may be connected to the image processing device 10 via a wired cable or connected wirelessly via a wireless LAN (Local Area Network) or the like. The image processing device 10 in the image processing system 1 may be connected to an external network such as the Internet by a cable 14 so as to download and acquire a content file. The image processing device 10 may be connected to an external network via wireless communication.

The image processing device 10 may be, e.g., a game device or a personal computer, and an image processing function may be achieved by loading an application program for image processing. The image processing device 10 enlarges/reduces an image displayed on a display of the display device 12 or scrolls the image upward, downward, leftward, or rightward, in accordance with a request for moving a viewpoint from the user. Hereinafter, such a process of changing a displayed area including enlargement/reduction is referred to as "the movement of a displayed area". When the user operates an input device while viewing an image displayed on the display, the input device transmits, to the image processing device 10, information that has been input.

Figure 2:
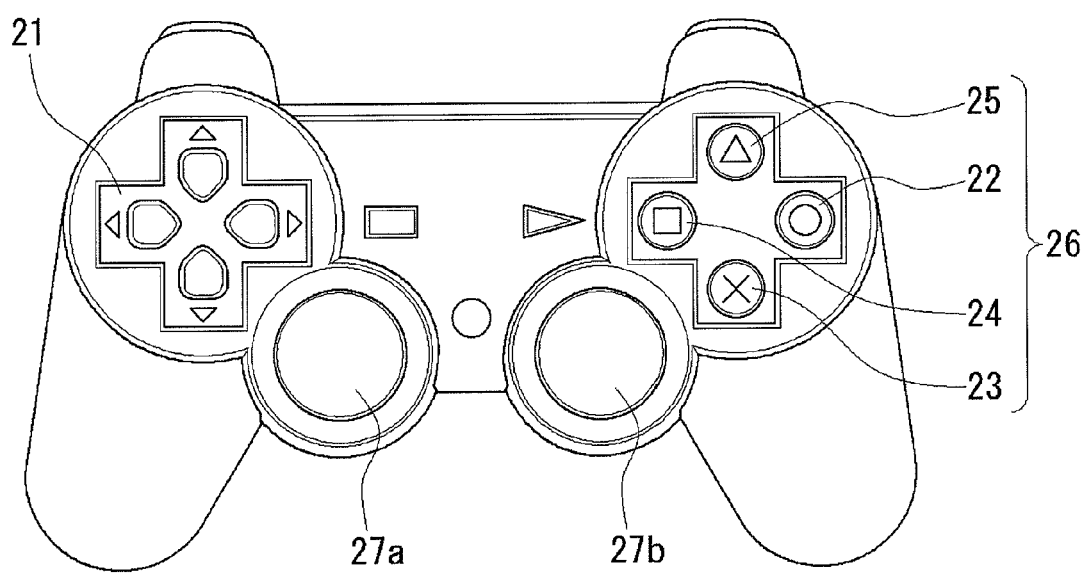
FIG. 2 is a diagram illustrating the exterior configuration of an input device applicable to the image processing system shown in FIG. 1.

FIG. 2 illustrates an example of the exterior configuration of an input device 20. The input device 20 is provided with directional keys 21, analog sticks 27a and 27b, and four types of operation buttons 26 as operation means that can be operated by the user. The four types of buttons 26 comprise a circle button 22, a cross button 23, a square button 24, and a triangle button 25.

The operation means of the input device 20 in the image processing system 1 is assigned a function of entering a request for enlarging/reducing a display image and a function of entering a request for scrolling upward, downward, leftward, or rightward. For example, the function of entering a request for enlarging/reducing a display image may be assigned to the right analog stick 27b. The user can input a request for reducing a display image by pulling the analog stick 27b toward the user and input a request for enlarging the display image by pushing the analog stick 27b away from the user.

The function of entering a request for scrolling is assigned to the directional keys 21. By pressing the directional keys 21, the user can enter a request for scrolling in the direction in which the directional keys 21 are pressed. The function of entering a request for moving a displayed area may be assigned to an alternative operation means. For example, the function of entering a request for scrolling may be assigned to the analog stick 27a. Keys for instructing start/termination of image display, for moving a cursor on an image being displayed, or for entering an undo operation are appropriately assigned. The input device 20 may be a commonly-used input device such as a mouse, a keyboard, and a touch panel or a combination of those.

The input device 20 has a function of transmitting to the image processing device 10 a signal requesting to move a displayed area that has been input. In the present embodiment, the input device 20 is configured such that the input device 20 is capable of communicating wirelessly with the image processing device 10. The input device 20 and the image processing device 10 may establish a wireless connection using Bluetooth (registered trademark) protocol or IEEE 802.11 protocol. The input device 20 may be connected to the image processing device 10 via a cable so as to transmit an input signal to the image processing device 10.

Figure 3:
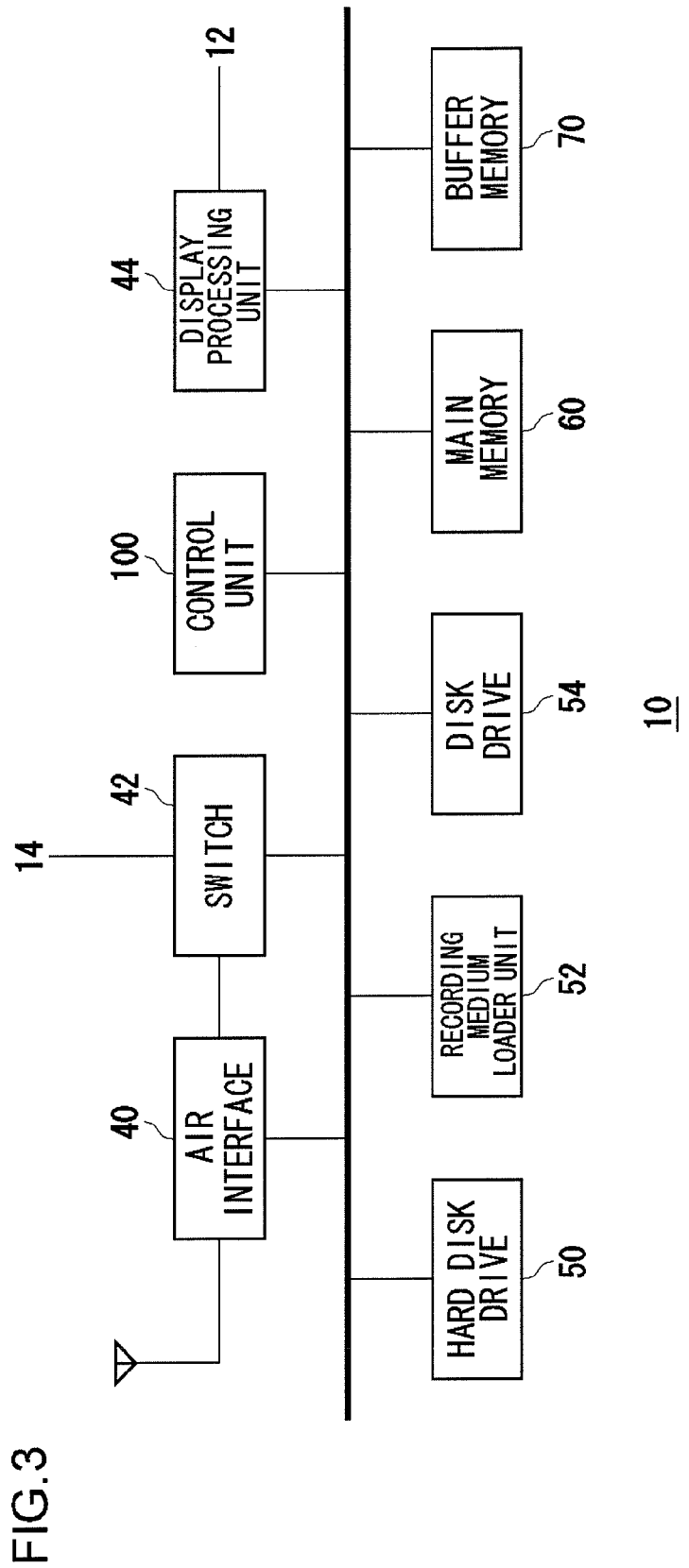
FIG. 3 is a diagram illustrating the configuration of an image processing device in the present embodiment.

FIG. 3 illustrates the configuration of the image processing device 10. The image processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark) and a device connected to an external device by wire or wirelessly so as to transmit and receive data. The switch 42 is connected to an external network via the cable 14 so as to receive a content file and the like from a content server. The switch 42 is connected to the air interface 40. The air interface 40 is connected to the input device 20 using a predefined wireless communication protocol. The signal entered by the user in the input device 20 is provided to the control unit 100 via the air interface 40 and the switch 42.

The hard disk drive 50 functions as a memory device for storing data. The content file may be stored in the hard disk drive 50. When a removable recording medium such as a memory card is mounted, the recording medium loader unit 52 reads data from the removable recording medium. When a read-only ROM disk is mounted, the disk drive 54 drives and recognizes the ROM disk so as to read data. The ROM disk may be an optical disk or a magneto-optical disk. The content file may be stored in the recording medium.

The control unit 100 is provided with a multicore CPU. One general-purpose processor core and a plurality of simple processor cores are provided in a single CPU. The general-purpose processor core is referred to as a power processing unit (PPU), and the other processor cores are referred to as synergistic-processing units (SPU). The control unit 100 may be further provided with a graphics processing unit (GPU).

The control unit 100 is provided with a memory controller connected to the main memory 60 and the buffer memory 70. The PPU is provided with a register and a main processor as an entity of calculation execution. The PPU efficiently allocates to the respective SPUs tasks as basic units of processing in applications to be executed. The PPU may execute a task by itself. The SPU is provided with a register, a subprocessor as an entity of calculation execution, and a local memory as a local memory area. The local memory may be used as the buffer memory 70.

The main memory 60 and the buffer memory 70 are memory devices and are formed as random access memories (RAM). The SPU is provided with a dedicated direct memory access (DMA) controller and is capable of high-speed data transfer between the main memory 60 and the buffer memory 70. High-speed data transfer is also achieved between the frame memory in the display processing unit 44 and the buffer memory 70. The control unit 100 according to the present embodiment realizes a high speed image processing function by allowing a plurality of SPU's to operate in parallel. The display processing unit 44 is connected to the display device 12 and outputs a result of image processing in accordance with user request.

The image processing device 10 according to the present embodiment loads a part of image data from the hard disk drive 50 into the main memory 60 in advance in order to smoothly perform a process of moving a displayed area of an image to be displayed as content. Further, the image processing device 10 decodes a part of the image data loaded into the main memory 60 and store the decoded image data in the buffer memory 70 in advance. This allows for an immediate switch of an image to be used for rendering the display image at a following timing as necessary.

The data structure of an image to be displayed in the present embodiment is not particularly limited. Here, an explanation is given of an example where hierarchical image data having a hierarchical structure is used in order to allow for more efficient display of high-definition images. Hierarchical image data is image data comprising images of different resolutions generated by reducing the size of an original image in a plurality of stages. An image in each layer is divided into one or a plurality of tile images. For example, the image with the lowest resolution comprises one tile image. The original image with the highest resolution comprises the largest number of tile images.

Figure 4:
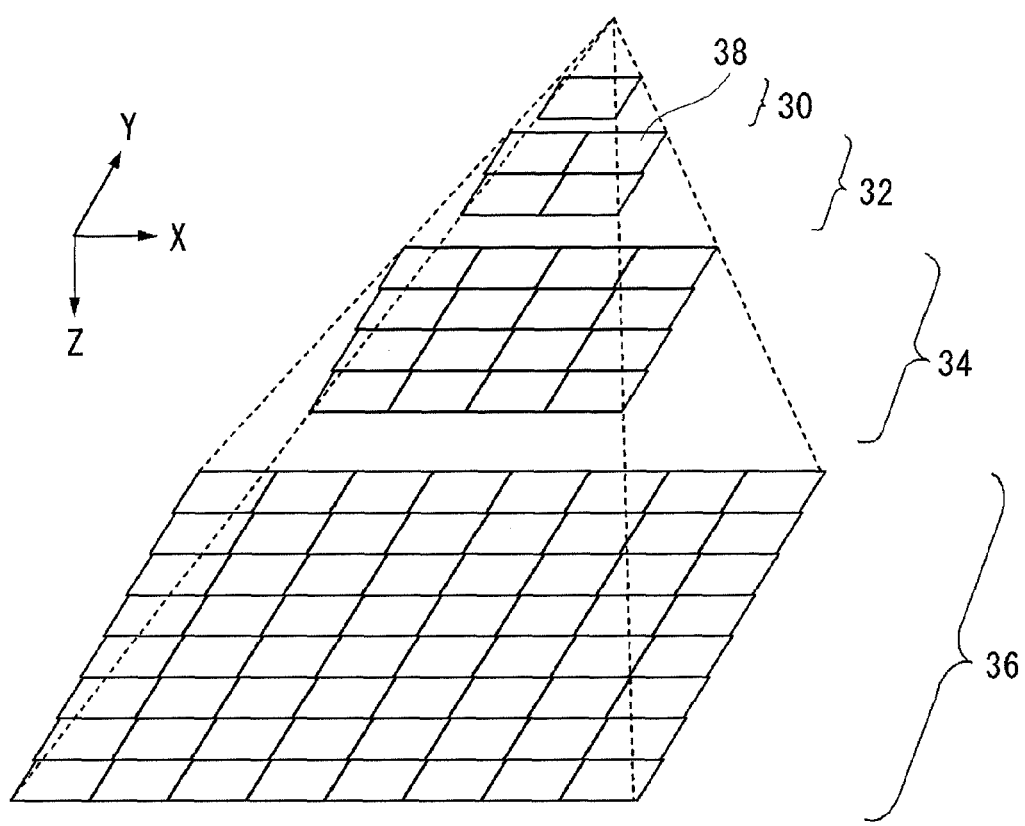
FIG. 4 is a conceptual diagram of the hierarchical structure of image data that can be used in the present embodiment.

Images are displayed such that an enlarged view or reduced view is presented quickly by switching a tile image being used for rendering to a tile image of a different layer when the display image reaches a predetermined resolution. Hereinafter, image data having such a hierarchical structure will be referred to as "hierarchical data". FIG. 4 illustrates a conceptual diagram of the structure of hierarchical data. The hierarchical data has a hierarchical structure comprising a 0-th layer 30, a first layer 32, a second layer 34, and a third layer 36 in the direction of depth (Z axis). While the figure only shows four layers, the number of layers is nonrestrictive.

The hierarchical data shown in FIG. 4 has a quadtree hierarchical structure. Each layer comprises one or more tile images 38. All of the tile images 38 are formed to have the same size having the same number of pixels and have, for example, 256×256 pixels. The image data in the respective layers are representations of an image in different resolution. The original image in the third layer 36 having the highest resolution is reduced in a plurality of stages to generate the image data for the second layer 34, the first layer 32, and the 0-th layer 30. For example, the resolution in an N-th layer (N is an integer equal to or greater than 0) may be ½ the resolution of the (N+1)-th layer in both the horizontal (X axis) direction and the vertical (Y axis) direction.

In the image processing device 10, the hierarchical data is compressed in a predefined compression format and is stored in a memory device such as the hard disk drive 50. The hierarchical data is then read from the memory device and decoded before being displayed on the display device 12. The image processing device 10 according to the present embodiment is provided with a decoding function compatible with a plurality of compression formats. For example, the image processing device is capable of decoding compressed data in the S3TC format, JPEG format, and JPEG2000 format.

As shown in FIG. 4, the hierarchical structure of the hierarchical data is configured such that the horizontal direction is defined along the X axis, the vertical direction is defined along the Y axis, and the depth direction is defined along the Z axis, thereby building a virtual three-dimensional space. The image processing device 10 derives the amount of change in the displayed area by referring to a signal requesting to move the viewpoint, the signal being supplied from the input device 20. Then the image processing device 10 uses the amount of change to derive the coordinates at the four corners of a displayed area (frame coordinates) in the virtual space.

Frame coordinates in the virtual space are used, e.g., for the determination of a link that is described later, for the loading of compressed data into the main memory, or for a process of rendering a display image. Instead of the frame coordinates in the virtual space, the image processing device 10 may derive information identifying a layer and the texture coordinates (UV coordinates) in the layer. Hereinafter, the combination of the information identifying a layer and the texture coordinates will also be referred to as frame coordinates. As described above, data of an image to be displayed in the present embodiment may not have a hierarchical structure. Alternatively, only a part of a plurality of items of image data that constitute content may be hierarchical data. Hereinafter, an explanation is given while also including hierarchical data as "image data".

The image processing device 10 according to the present embodiment has a function of switching, when a displayed area moved according to a user request for moving a viewpoint is included in a given area set in an image being displayed, display to another image that has been mapped to the area in advance. Hereinafter, switching between images will be referred to as "link", and an area that has been set and as a trigger of a link will be referred to as a "link area".

Figure 5:
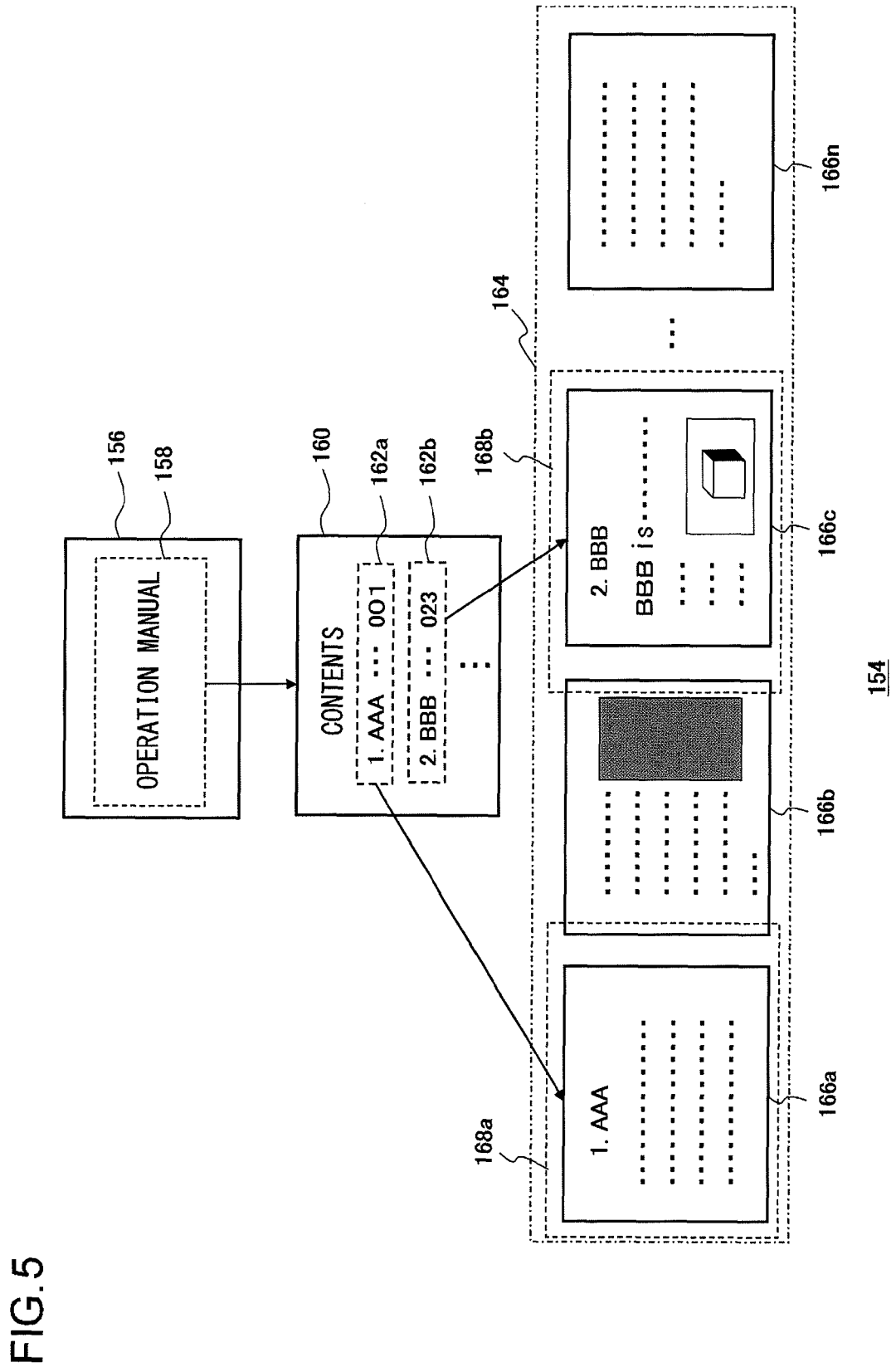
FIG. 5 is a diagram illustrating an example of setting a link for an image that constitutes content in the present embodiment.

FIG. 5 illustrates an example of setting a link for an image that constitutes content. In the figure, Content 154 shows, for example, an electronic book having a cover, a contents page, and text pages and is constituted by a cover image 156, a contents image 160, and text images 164 that respectively correspond to the pages. The text images 164 are set to include separate images 166a, 166b, 166c, . . . , and 166n for respective pages of the book. If there are a plurality of pages for the contents image 160, the contents image 160 may also be constituted by a plurality of images that correspond to the respective pages.

Hereinafter, separate images thus configured will be referred to as "page images". Alternatively, respective images may be made in any predetermined unit, such as a unit of a chapter, an article, an item, instead of a unit of a page, according to what the content shows. As described above, each image may be of hierarchical data, may be an image of a single resolution, or may be different for each page depending on the range of resolutions required for display.

First, a link area 158 is set such that the link area 158 surrounds a title, "Operation Manual", displayed in the cover image 156, and a link destination thereof is set to be the contents image 160. In this case, a viewpoint moves closer to an area near the title during the display of the cover image 156, and when a displayed area is encompassed by the link area 158, a display target is changed from the cover image 156 to the contents image 160, which is the link destination.

Similarly, link areas 162a, 162b, . . . are set such that the link areas surround respective items of the contents such as an item "1. AAA", an item "2. BBB", . . . shown in the contents image 160, and respective link destinations thereof are set to be respective corresponding page images included in the text images 164. When a displayed area is encompassed in the link area 162a of the item "1. AAA", a display target is changed to a page image 166a, which corresponds to the item. Similarly, when the displayed area is encompassed in the link area 162b of the item "2. BBB", the display target is changed to a page image 166c, which corresponds to the item.

For each of page images 166a, 166b, 166c, . . . 166n, a link for a previous page and a link for a subsequent page are also set. In this case, a link area is set to be a predetermined area that includes an area outside a page image. For example, for the page image 166b, a link area 168a linking to the previous page image 166a is set on the left side, and a link area 168b linking to the subsequent page image 166c is set on the right side as shown in the figure. As shown in the figure, a part of a link area may be included inside the page image 166b subject to setting. Alternatively, a part of a link area may not be included inside the page image 166b.

By setting respective link areas for all the pages images 166a, 166b, 166c, . . . 166n at respective positions thus described, a subsequent page will be displayed when a displayed area moves to the right, and a previous page will be displayed when the displayed area moves to the left. As a result, images can be perceived as if the images are arranged from the left to the right in order of pages. In an example shown in the figure, an order employed is an order for switching pages based on a natural viewpoint movement for books or the like for which reading is proceeded from the left to the right. However, in the case where it is more natural to read from the right to the left for reasons of languages or production effects, the order of link destination pages is reversed. Alternatively, link areas may be set on the top and on the bottom of an image. Further, by setting link areas on the left, on the right, on the top, and on the bottom, a two-dimensional array of images can be produced. A description will follow regarding a detailed rule for setting a link area.

By employing such a configuration, display images such as a cover, contents, text of each item can be seamlessly switched only by viewpoint movement. As a result, direct access to an item the user wishes to read can be possible by an intuitive and easy operation. By separating the text image into separate items of image data in predetermined units such as pages, the management of image data becomes easier compared to a case where the text image is treated as a single item of image data that enumerates all the pages. Thus, processes necessary for image display can be performed similarly regardless of the number of the pages.

In a case where required resolutions vary depending on a page, e.g., in a case of a book that contains both pages with photos and pictures and pages containing text only, dividing data of a text image in advance allows resolutions to be changed for each division unit or allows the data to be hierarchical data for some of division units. With this, content display with variations can be achieved without increasing the data size. For example, sufficient amount of data is prepared for a page desired to have a wide range of resolutions while minimizing the data size for a page that does not require a high-resolution image. Further, editing and revising tasks such as changing a part of the contents and replacing, adding, or deleting a page can be performed in units of images. As a result, only a minimum amount is necessary for a process that requires a high load such as rasterizing vector data of a book into image data. Thus, the workload can be reduced.

Figure 6:
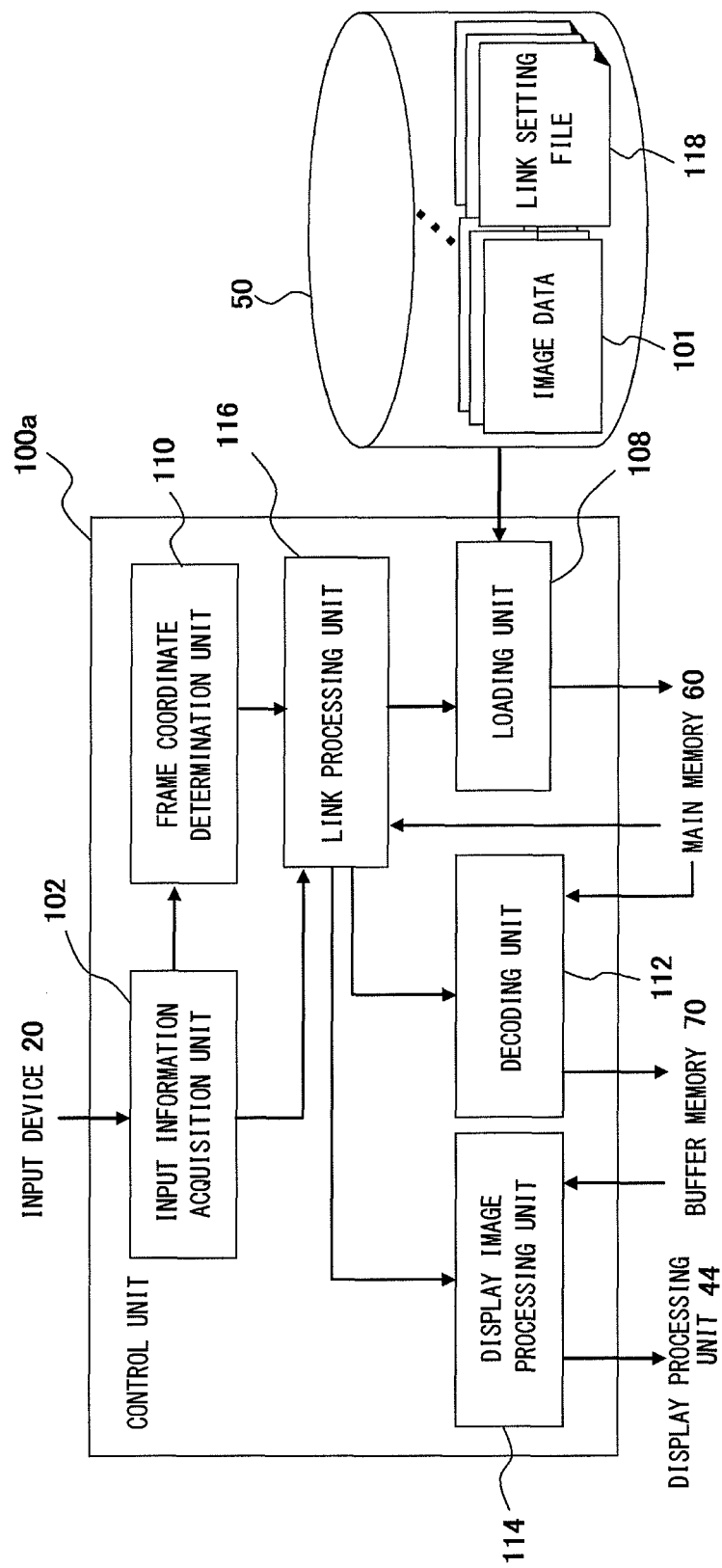
FIG. 6 is a diagram illustrating a detailed configuration of a control unit having a function of displaying an image of content in the present embodiment.

FIG. 6 illustrates a detailed configuration of a control unit 100a having a function of displaying an image of content such as the one described above in the present embodiment. The control unit 100a comprises an input information acquisition unit 102 for acquiring information entered by the user via the input device 20, a frame coordinate determination unit 110 for determining the frame coordinates of an area to be newly displayed, a link processing unit 116 for determining whether or not a switching of an image to be displayed is necessary based on a link setting, and a loading unit 108 for loading necessary compressed image data from the hard disk drive 50. The control unit 100a further comprises a decoding unit 112 for decoding compressed image data and a display image processing unit 114 for rendering an image frame.

Figure 8:
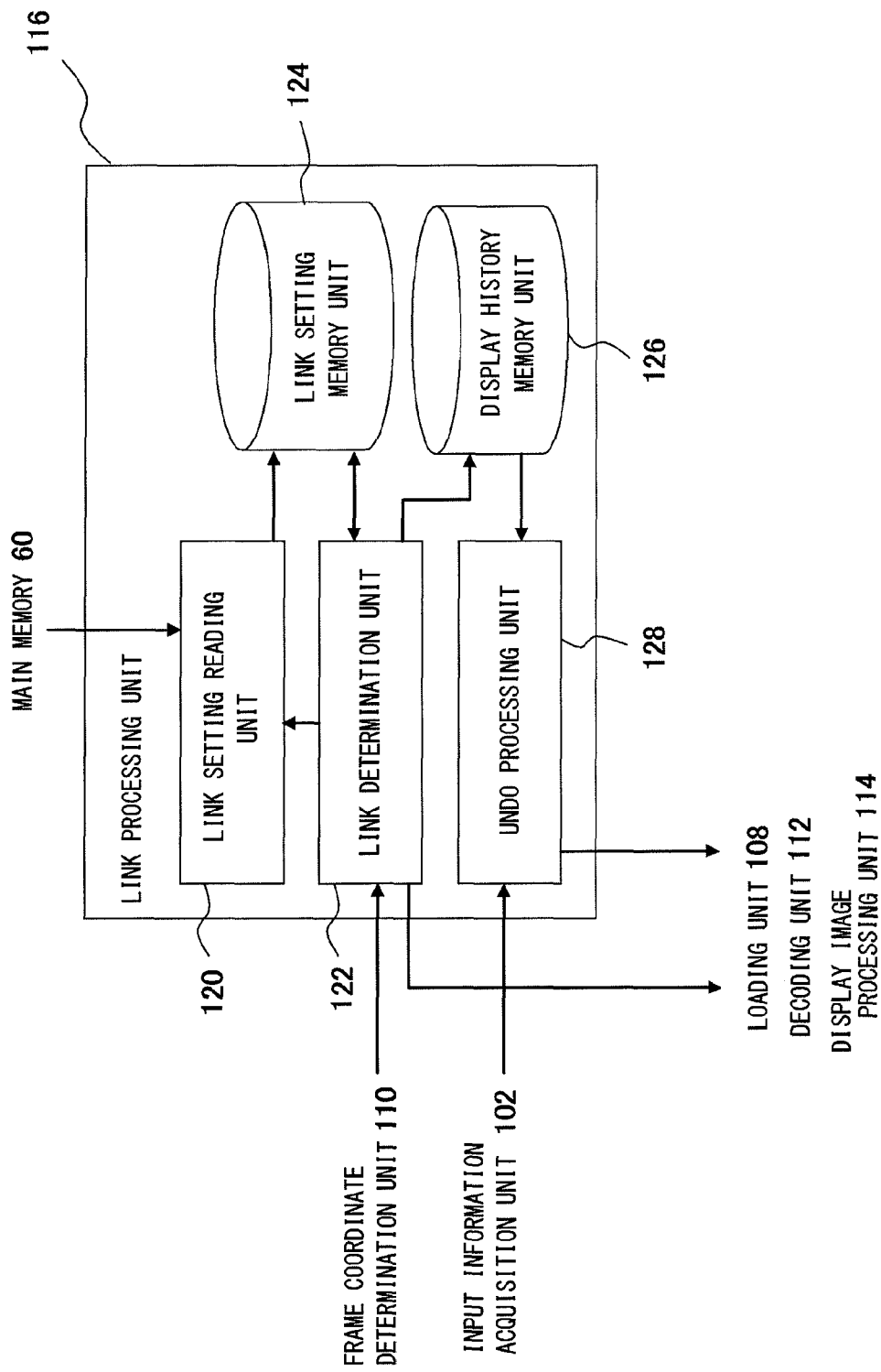
FIG. 8 is a diagram illustrating a detailed configuration of a link processing unit in the present embodiment.
Figure 12:
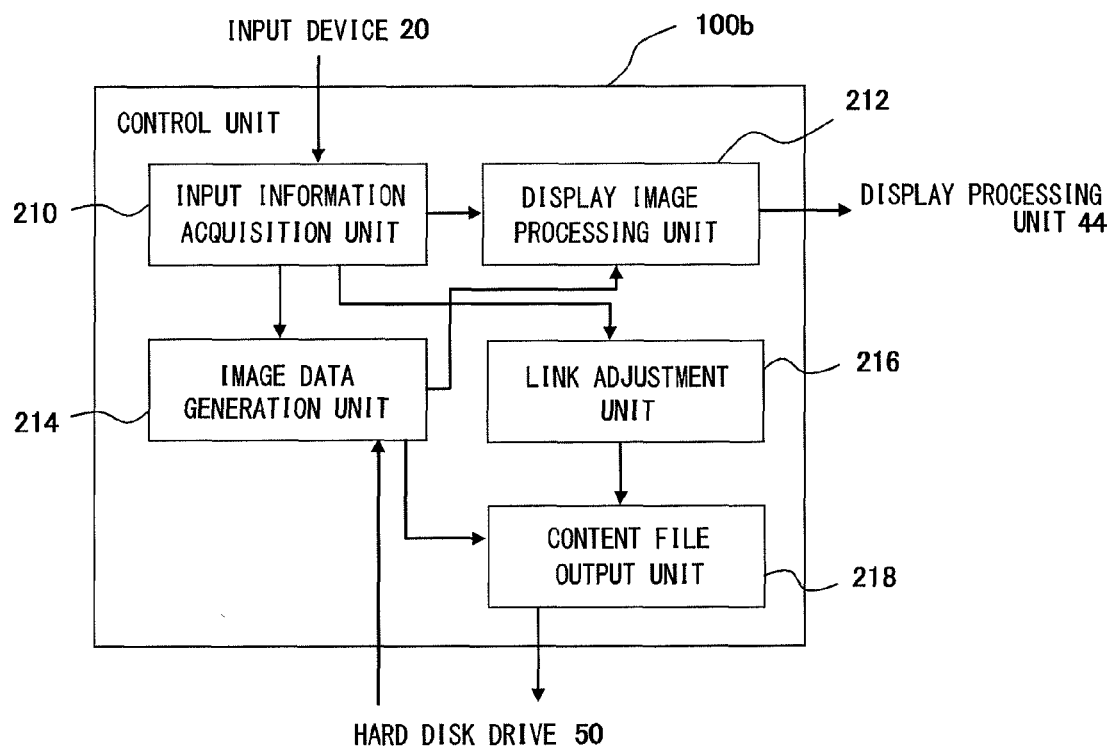
FIG. 12 is a diagram illustrating a detailed configuration of a control unit of an image processing device having a function of creating content that displays an image for which a link is set in the present embodiment.

In FIG. 6 and FIGS. 8 and 12 referred to later, the elements shown in functional blocks that indicate a variety of processes are implemented in hardware by any CPU (Central Processing Unit), memory, or other LSI's, and in software by a program loaded in memory, etc. As stated previously, the control unit 100 has one PPU and a plurality of SPU's, and functional blocks can be formed by a PPU only, a SPU only, or the cooperation of both. Therefore, it will be obvious to those skilled in the art that the functional blocks may be implemented in a variety of manners by a combination of hardware and software.

In the hard disk drive 50, a content file is stored first that has a structure in which a plurality of items of image data 101 that constitute content such as the cover image, the contents image, and the page image shown in FIG. 5 are mapped to a link setting file 118 that describes information regarding links set for the image data 101. In the link setting file 118, the frame coordinates of a link area set for each image and identification information of the destination image of the link, are described in association with each other. Further, a part of an area of the destination image of the link may be set as a link destination area. The image data 101 and the link setting file 118 that is mapped to the image data 101 are loaded into the main memory 60 at a timing as necessary.

The input information acquisition unit 102 acquires a request entered by the user via the input device 20 to start/terminate image display of content, move the viewpoint, etc., and notifies the frame coordinate determination unit 110 of the request. The frame coordinate determination unit 110 determines the frame coordinates of a displayed area for a subsequent time instant from the amount of movement that is based on the frame coordinates of the current displayed area and a request for moving the viewpoint entered by the user and notifies the link processing unit 106 of the determined frame coordinates. The "subsequent time instant" in this case is, e.g., a time instant after a cycle for updating display that is based on a frame rate.

The link processing unit 116 reads out the link setting file 118 that has been loaded into the main memory 60 and that corresponds to the image data to be displayed and determines whether or not the displayed area for the subsequent time instant is encompassed in a link area. If the displayed area is encompassed in the link area, the link processing unit 116 validates the link and acquires, from the link setting file 118, identification information for link destination image data that is set in association with the link area. The link processing unit 116 notifies the loading unit 108, the decoding unit 112, and the display image processing unit 144 of the acquired information.

If an image that is currently subject to display is an image switched by a link, the link processing unit 116 also determines whether or not the displayed area moves outside of a link area that has been a trigger of the link of which destination is the image. If the displayed area moves outside of the link area, the link processing unit 116 notifies the loading unit 108, the decoding unit 112, and the display image processing unit 144 of a notification indicating that a display target is to be switched back to an image of a link origin. Further, if none of the above-stated conditions applies, the link processing unit 116 notifies the loading unit 108, the decoding unit 112, and the display image processing unit 144 of only the frame coordinates of the diplayed area for the subsequent time instant.

Based on information as notified from the link processing unit 116, the loading unit 108 checks whether there is compressed image data to be loaded into the main memory 60 from the hard disk drive 50 and loads the compressed image data if necessary. The compressed image data to be newly loaded is, e.g., image data 101 of a link destination used when an image to be displayed is switched.

If the link destination image includes hierarchical data, the loading unit 108 loads a tile image of a layer necessary for displaying an image that is set to be an initial image in advance, e.g., image data of a 0-th layer that has the lowest resolution and that allows the entire image to be displayed all at once. In the case of loading new image data 101, the loading unit 108 also loads a link setting file 118 that is associated to the image data 101.

In the case of loading image data in a unit of predetermined blocks, such as a unit of tile images of hierarchical data, the loading unit 108 loads, according to the movement of the diplayed area, image data of surrounding blocks thereof regardless of the necessity of image switching. Alternatively, the loading unit 108 loads image data of a block predicted to become necessary thereafter in accordance with a moving path of the diplayed area obtained thus far. The loading unit 108 may load necessary image data at predetermined time intervals in addition to a time when the user enters a request for moving the viewpoint.

Based on the notification from the link processing unit 116, the decoding unit 112 checks whether or not the image data necessary for the diplayed area for the subsequent time instant is included in decoded image data that is stored in the buffer memory 70. If the image data is not included in the decoded image data, the decoding unit 112 reads necessary compressed image data from the main memory 60, decodes it, and stores the decoded image data in the buffer memory 70. By decoding data of a broad range of image including the current diplayed area and storing the decoded image data in the buffer memory 70 in advance, the diplayed area can be moved smoothly. Also, by allowing data of an image of the link origin that was displayed before the switching of the current display image to be kept stored, a switching-back process for a display image described later can be efficiently achieved.

Based on the notification from the link processing unit 116, the display image processing unit 114 reads image data necessary for the diplayed area for the subsequent time instant from the buffer memory 70 as necessary and renders the image data in the frame memory of the display processing unit 44. Also in the frame memory, by allowing an image of the link origin that was displayed before the switching of the display image to be kept remaining, a switching-back process of switching back a display image described later can be efficiently achieved.

In the case of an image with expressed information that has a hierarchical structure such as the cover image 156, the contents image 160, and the text image 164 of the content 154 shown in FIG. 5, by setting as a link area an area that shows information serving as a node of the hierarchical structure such as a title described on a cover and each item of contents in advance, desired information of a lower layer node can be easily reached only by viewpoint movement. On the other hand, by linking images having information without hierarchy such as the text images 164 in FIG. 5, the continuity of pages can be expressed just like reading an actual book even for separate images, in the present embodiment.

Figure 7:
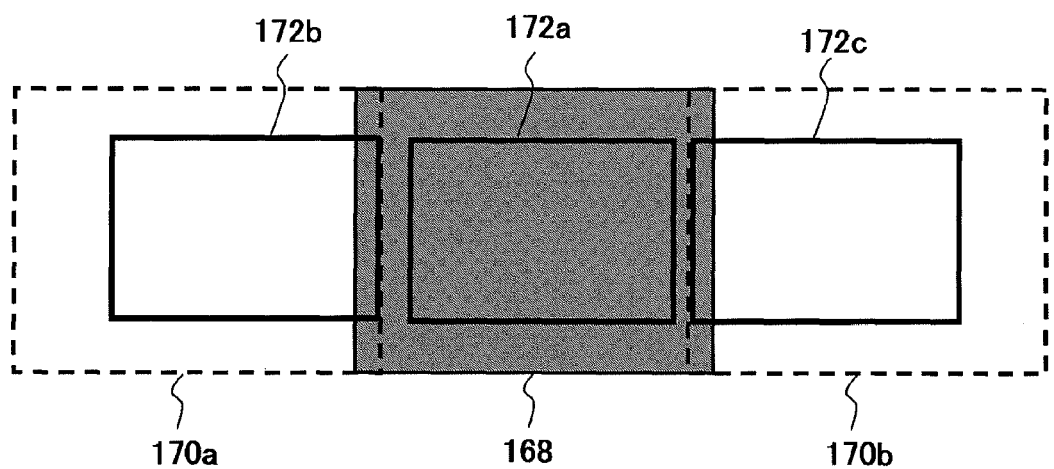
FIG. 7 is a diagram illustrating an example of setting a link area for an image showing information without hierarchy in the present embodiment.

By allowing the pages to be freely moved back and forth while keeping the continuity of the pages in this case, a feeling more similar to reading an actual book can be offered to the user. FIG. 7 illustrates an example of setting a link area when such a mode is realized. In the figure, for the shaded page image 168, a link area 170a and a link area 170b are set on the left and the right thereof, respectively.

A link area 170a on the left side sets a link to a page that is one page before the page image 168 in a page sequence such as the text images 164, and a link area 170b on the right side sets a link to a page that is one page after the page image 168. When a diplayed area 172a displaying the page image 168 to be displayed is moved to the left such that the entire diplayed area 172a is encompassed in the link area 170a on the left side, the corresponding link is determine to be valid, and the image to be displayed is switched. As a result, at least a part of the page image that is one page before and that is a link destination is displayed in a diplayed area 172*b* at that time.

In contrast, when a diplayed area 172*a* is moved to the right such that the entire diplayed area 172*a* is encompassed in the link area 170*b* on the right side, the corresponding link is determine to be valid, and the image to be displayed is switched. As a result, at least a part of the page image that is one page after and that is a link destination is displayed in a diplayed area 172*c* at that time. The size of the diplayed areas 172*a* through 172*c* in the figure changes based on a distance between a viewpoint and an image plane according to a viewpoint operation by the user.

In the present embodiment, an area outside a page image to be displayed is allowed to be included in a diplayed area, and switching to a previous page or a subsequent page is performed by such a movement as described. A background image or the like that is prepared beforehand is used for a surrounding area of a page image to be displayed. When the switching of an image to be displayed is performed by the movement of the diplayed area, the background image may be displayed while hiding a page image that was previously a display target or the page image may be kept displayed. Hereinafter, an image of the display target is referred to as "active image".

If a bidirectional link area such as the one shown in FIG. 7 is set for all the page images, a similar linking process will be necessarily performed every time an active image is switched. In this case, even in a situation, for example, where user wants to check some pages by moving previous and subsequent page images back and forth many times, processes are generated such as acquiring identification information of an image of a link destination and determining whether or not data is being loaded and decoded, as when a page image becomes an active image and is displayed for the first time. However, it is easy to keep a page image, which was an active image immediately before the switching, ready for immediate display even after the switching.

Therefore, in the present embodiment, the efficiency of active image switching is improved by distinguishing a linking process of linking to a new page image and a switching-back process of switching back to an original page image without changing an apparent operation of switching display to a previous or subsequent page image by a viewpoint movement. Therefore, the validity of a link set for a current active image and the invalidity of a link set for an image that was an active image before the current one are determined at the same time.

FIG. 8 illustrates a detailed configuration of the link processing unit 116 in this case. The link processing unit 116 comprises a link setting reading unit 120 for reading a link setting file that is mapped to data of an active image, a link setting memory unit 124 for storing the link setting file that has been read, a link determination unit 122 for determining the validity and invalidity of a link based on the frame coordinates of a diplayed area, a display history memory unit 126 for storing a history for active image switching by a linking process, and an undo processing unit 128 for undoing the switching of an active image by a link.

The link setting reading unit 120 reads, at a time when image display is started or when an active image is switched by a link, a link setting file 118 mapped to image data 101 of the active image from the main memory 60 and stores the link setting file 118 in the link setting memory unit 124. The link setting memory unit 124 stores at least information regarding a link set for a current active image and information regarding a link set for a previous active image.

The link determination unit 122 reads a link area set for the current active image from the link setting memory unit 124 and determines whether or not the link is valid by checking an inclusion relationship between a diplayed area and the link area every time the diplayed area moves. The frame coordinates of the diplayed area are acquired from the frame coordinate determination unit 110. If the diplayed area is encompassed in the link area and the link is determined to be valid, the link determination unit 122 reads the identification information of image data mapped to the link area from the link setting memory unit 124 and notifies the loading unit 108, the decoding unit 112, and the display image processing unit 144 of the identification information.

If an area, in the image data of a link destination, that is to be initially displayed is further set in the link setting file, the link determination unit 122 also notifies the loading unit 108, the decoding unit 112, and the display image processing unit 144 of corresponding information. When the loading unit 108, the decoding unit 112, and the display image processing unit 144 each perform a process of loading, decoding, and rendering image data as necessary based on this notification, an image of the link destination becomes an active image.

The link determination unit 122 further reads a link area set for the previous active image, which is a link origin of the current active image, from the link setting memory unit 124. Then, by checking an inclusion relationship with the diplayed area, the link determination unit 122 determines whether or not a link used for the switching to the current active image is to be invalidated. In other words, it is considered that a reason for why the current active image is an active image is because a link from the previous active image is valid.

By continuing to monitor the validity of the link even after the switching of the active image, the link determination unit 122 determines whether or not the link is to be invalidated. If the link is determined to be invalid, the link determination unit 122 brings back the previous active image, which is the link origin, as an image to be displayed. In this case, by saving the data of the previous active image in the buffer memory 70, a frame memory, or the like at all times, the link determination unit 122 just need to notify only the display image processing unit 114 of the data. By minimal processes such as rendering the image in the frame memory by the display image processing unit 114, or allowing an output image to be switched by notifying the display processing unit 44 by the display image processing unit 114, an active image can be switched back.

As described, the validity of a link set for a current active image and the invalidity of a link set for the previous active image are determined at the same time in the present embodiment. By using this function, processes can be separated into three patterns regarding a movement of a diplayed area: a switching-back process of switching back to a previous active image; continuous display of an active image; and a linking process of linking to a subsequent image from the active image.

If the link to a subsequent image is determined to be valid, the link determination unit 122 accumulates and stores the identification information of the subsequent image in the display history memory unit 126. In other words, the display history memory unit 126 stores the transition of active images switched by the linking process as a history. When an undo operation is entered by the user, the undo processing unit 128 acquires from the input information acquisition unit 102 information indicating that the operation has been entered by the user. This input function is, for example, assigned in advance to the cross button 23 of the input device 20 shown in FIG. 2. Every time the cross button 23 is pressed, the undo processing unit 128 reads identification information last recorded in the display history memory unit 126 and notifies the loading unit 108, the decoding unit 112, and the display image processing unit 144 of the identification information.

The identification information read from the display history memory unit 126 is to be deleted. When the loading unit 108, the decoding unit 112, and the display image processing unit 144 each perform, as necessary, a process of loading, decoding, and rendering image data having the identification information as notified based on this notification, a corresponding image becomes an active image. Such an undo process is performed to undo display in larger units than the units of a process of switching back to a previous active image, which is described above, in the present embodiment.

As described above, since the process of switching back an active image based on the determination of the invalidity of a link is different from the linking process, this is not stored in a display history that records the transition of active images switched by the linking process. For example, in the case where a user checks contents by going back and forth between a certain page and a subsequent page thereof repeatedly, if all such a switching of the pages are performed by the linking process and a history thereof is stored, it can be considered that a memory area of the display history memory unit 126 is occupied only by the information. Information regarding an image displayed before such repeatedly switching will be lost at this time. As a result, even when the user enters an undo operation to return to a display image shown before the repeatedly switching, there is a possibility that the same pages are only moved back and forth, and an originally-desired image may not be brought back.

In the present embodiment, even when a user operation is the same, a linking process and a process of switching back an active image are separated inside the device, and only a history of active images by the linking process is recorded in the display history memory unit 126. Therefore, a process of switching back and forth the same pages is not recorded as a display history, and the unintended replay where the same pages are switched back and forth will not be performed by an undo operation while preventing necessary information regarding previous display images from being lost.

As described above, a link area set for a current active image and a link area set for the previous active image are subjected to determinations at the same time in the present embodiment. By employing such a configuration, even when images including information that does not have a hierarchical structure is separated into a plurality of items of image data as in the case of the text images 164 shown in FIG. 5, display of content can be realized that can offer a feeling of turning the pages of a book. In order to achieve this mode, a proper setting of a link area in addition to a configuration of a device described thus far is necessary.

Figure 9:
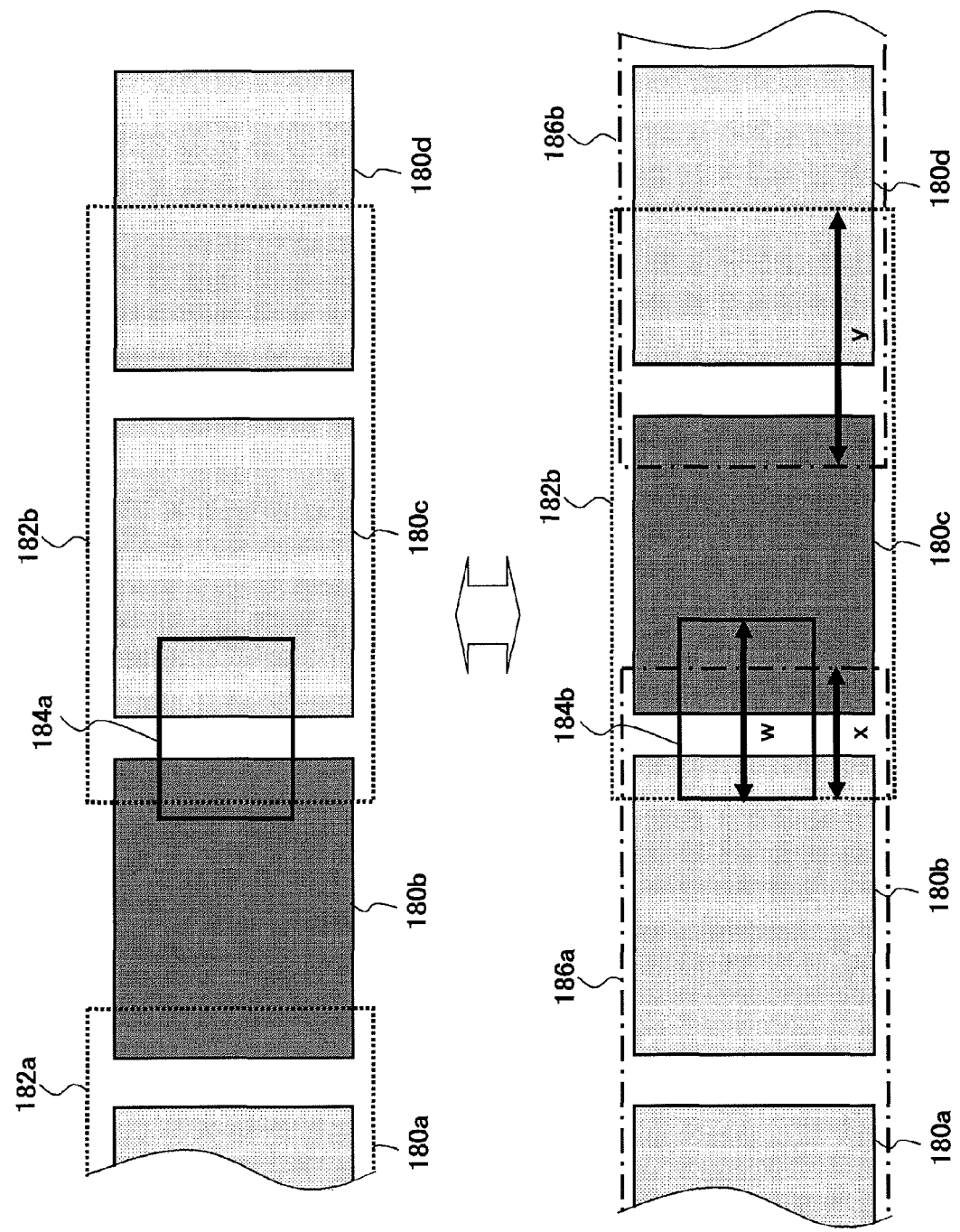
FIG. 9 is a diagram for explaining a rule for setting a link in the present embodiment.

FIG. 9 is a diagram for explaining a rule for setting a link. In the figure, an upper row and a lower row show the same virtual array of a plurality of page images 180*a*, 180*b*, 180*c*, and 180*d*, and page images that are darker shaded are active images. Page images other than the active images may be hidden in practice. Alternatively, a page image of a link origin, i.e., the previous active image may remain displayed. To switch an active image based on such a virtual array, a link area linking to the previous page and a link area linking to the subsequent page are set on the left side and the right side of each image, respectively, as in FIG. 7.

For example, as shown in the upper row in the figure, a link area 182*a* setting a link for the previous page image 180*a* is set on the left side of the page image 180*b*, and a link area 182*b* setting a link for the subsequent page image 180*c* is set on the right side of the page image 180*b*. If a page image 180*b* is an active image, these link areas 182*a* and 182*b* are subject to determination of link validity, and the necessity of the switching of an active image is determined according to an inclusion relationship with a diplayed area 184*a*.

In the upper row in FIG. 9, the diplayed area 184*a* is located near the right end of the page image 180*b*, which is an active image, by a user request for moving a viewpoint. When the diplayed area 184*a* is further moved to the right side such that the diplayed area 184*a* is included in the link area 182*b* linking to a subsequent page, the link determination unit 122 determines that a corresponding link is valid. A condition occurring at this time is shown in the lower row in FIG. 9. In other words, the subsequent page image 180*c* becomes an active image at the point when the diplayed area 184*b* is encompassed in the link area 182*b*, which is set for the page image 180*b*.

While the active image is switched to the page image 180*c*, a link area 186*a* linking to the previous page image 180*b* and a link area 186*b* linking to the subsequent page image 180*d*, which are set for the page image 180*c*, become subject to determination of link validity. Therefore, the previous page image 180*b* becomes an active image when the diplayed area 184*b* is encompassed in the link area 186*a*, and the subsequent page image 180*d* becomes an active image when the diplayed area 184*b* is encompassed in the link area 186*b*.

On the other hand, as described above, the link area 182*b* set for the image of a link origin of the current active image, i.e., the page image 180*b* in FIG. 9 is also saved in the link setting memory unit 124, and the invalidity of a link to the page image 180*c*, which is the current active image, is determined at the same time in the present embodiment. In other words, the validity of the link that has been determined to be valid when the active image was switched from the page image 180*b* to the page image 180*c* continues to be monitored even after the switching. When the validity is no longer maintained, the link to the page image 180*c*, which is the current active image, is invalidated, and the active image is switched back to the page image 180*b* of the link origin.

For example, when the diplayed area 184*b* in the lower row in FIG. 9 moves to the left such that the diplayed area 184*b* is no longer encompassed in the link area 182*b* set for the page image 180*b*, which was an active image immediately before, in other words, when even a part of the diplayed area 184*b* moves outside the link area 182*b*, a link from the page image 180*b* to the page image 180*c* that has been valid is determined to be invalid. The active image is then switched to the page image 180*b*.

As described, by continuing, even after an active image is switched by a link determined to be valid, to monitor the validity of the link, a linking process is no longer necessary when switching the active image back. Since a page image of a link origin is the previous active image, at least a part of the linking process can be omitted as described above.

Although a process performed in the device is different, the operation as it appears in which an active image is switched by the movement of a viewpoint is not changed regardless of whether the active image is switched back or switched forward. Thus, the user can switch page images back and forth by a similar operation. As described, in order to achieve operation as it appears to be the same and to allow the linking process to be omitted in the device, the validity of a link set for a current active image and the invalidity of a link set for the previous active image are set such that the validity and the invalidity can be always determined at the same time.

In this case, even when switching an active image back, a normal linking process will be started if the validity of a link set for a current active image is determined before the invalidity of a link set for the previous active image. A degree of an overlap of link areas set for respective page images is devised. In other words, a link area is set such that, before a diplayed area is encompassed in a link area set for a current active image, at least a part of the diplayed area moves outside a link area set for the previous active image.

An overlap of link areas means an overlap of link areas set for respective images if an image before switching and an image after the switching are displayed at the same time and is determined based on a relative position, with respect to a diplayed area occurring at the time of switching an active image by a link, of an image before the switching and a relative position of an image after the switching.

In an example shown in the lower row in FIG. 9, when the diplayed area 184b is moved to the left even a little, a part of the left area of the diplayed area 184b moves outside the link area 182b set for the previous active image. However, the diplayed area 184b will not be encompassed in the link area 186a set for the current active image until the diplayed area 184b is further moved. With this, the invalidity of a link of the link area 182b is determined before the validity of a link of the link area 186a, and the active image can be switched back to the page image 180b, which is a link origin, without performing the linking process.

In order to achieve such a mode, an area in which the link area 182b linking to the current active image from the previous active image overlaps with the link area 186a linking to the previous active image from the current active image needs to have a size that does not allow the diplayed area to be encompassed. As shown in this example, when a virtual array of images is set to be one dimensional in the horizontal direction, a width x of an overlapped area in the horizontal direction needs to be set to be always smaller than a width w of the diplayed area 184b. For example, when an upper limit is provided to a magnification ratio for image display, since the width of a diplayed area at that time is a minimum value $w_{min}$, x is determined so that x is less than $w_{min}$.

On the other hand, when the diplayed area 184b is moved to the right such that the subsequent page image 180d becomes an active image, it is necessary to determine that a link to the subsequent page image is valid before determining that a link to the current active image is invalid. In the example shown in the lower row in FIG. 9, when the diplayed area 184b is moved to the right, the diplayed area 184b is encompassed, before a part of the diplayed area 184b moves outside the link area 182b set for the previous active image, in the link area 186b linking to the subsequent page image 180d set for the current active image. With this, the validity of the link area 186b is determined before the invalidity of the link area 182b, and the active image can be switched to the subsequent page image 180d.

In order to achieve such a mode, an area in which the link area 182b linking to the current active image from the previous active image overlaps with the link area 186b, among two link areas set for the current active image, linking to a page image that is not the previous active image needs to have a size that allows the diplayed area to be encompassed. In the case of this example, a width y of an overlapped area in the horizontal direction needs to be set to be always greater than or equal to a width w of the diplayed area 184b. For example, when a lower limit is provided to a magnification ratio for image display, since the width of a diplayed area at that time is a maximum value $w_{max}$, y is determined so that y is greater than or equal to $w_{max}$.

Figure 10:
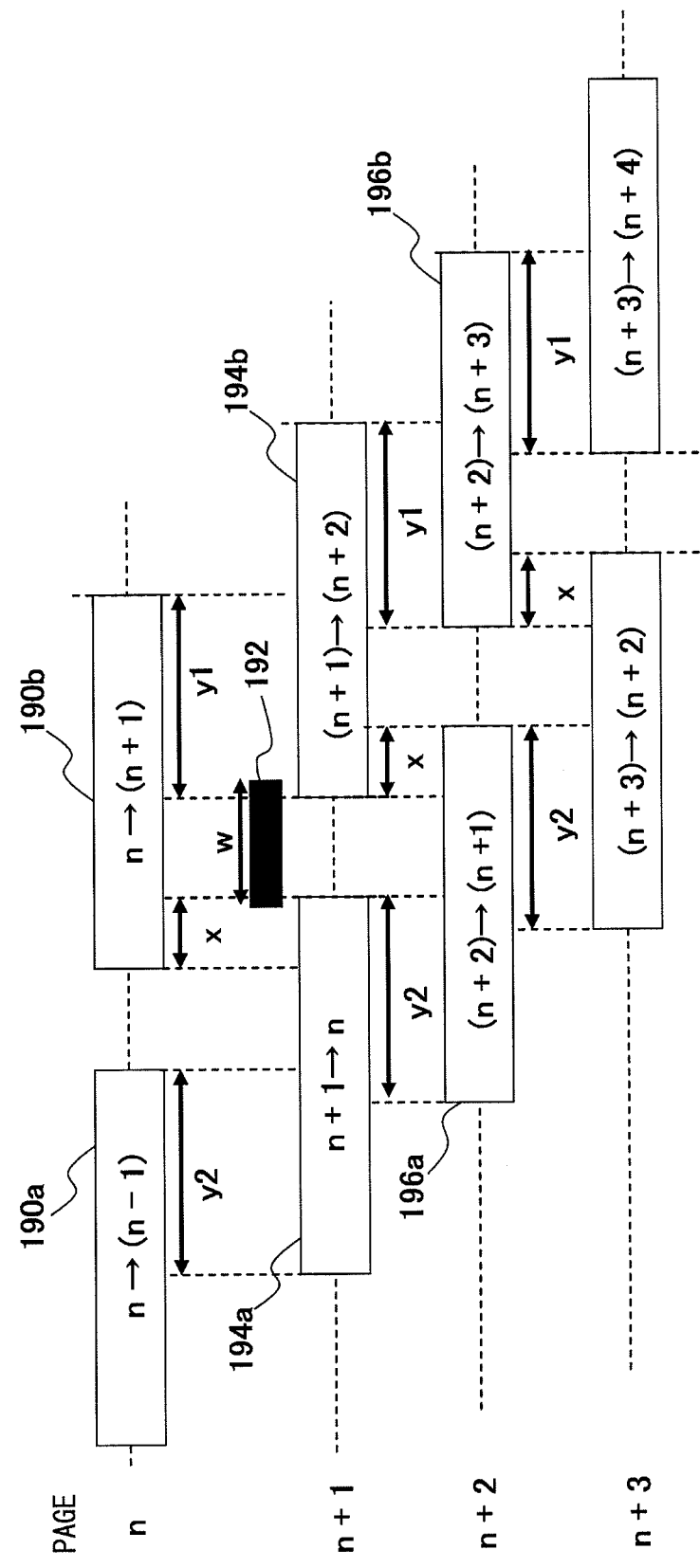
FIG. 10 is a diagram in which a rule for an overlap width of a link area that is set in the present embodiment is generalized regardless of the direction of viewpoint movement.

The embodiment described above is the example where, in the middle of sequentially switching an active image by moving the viewpoint in the rightward direction with respect to a page image sequence, the viewpoint is moved back to the leftward direction or is further moved in the rightward direction. The same applies to the case where the direction is reversed. FIG. 10 is a diagram in which a rule for an overlap width of link areas that is set, in order to allow for a linking process and a switching-back process, is generalized regardless of the direction of viewpoint movement.

In the figure, respective rows show link areas set for respective page images of pages n, (n+1), (n+2), and (n+3) by rectangles when n is set to be a natural number. Just like FIG. 9, the figure shows a case where a movement of a diplayed area is one dimensional, occurring only in the horizontal direction. To facilitate understanding, the height of a link area is not taken into consideration. An indication shown in each rectangle representing a link area shows the page number of a link origin and the page number of a link destination that are set for a corresponding link. For example, among link areas 190a and 190b set for a page image of the n page, the left link area 190a represents an area for link to page (n−1) from page n, and the right link area 190b represents an area for link to page (n+1) from page n. The same applies to other link areas.

It is assumed that page (n+1) represents an active image and that a diplayed area 192 is located in the middle of two link areas 194a and 194b that are set for the page image. The contents of page (n+1) are mainly displayed at this time. There is a possibility that such a situation occurs by a link from page n or a link from page (n+2) when excepting a case of a link from an upper layer such as a contents image.

If page (n+1) becomes the active image by the link from page n, the link areas 190a and 190b set for page n are subject to determination of link invalidity, and the link areas 194a and 194b set for page (n+1) are subject to determination of link validity. When further forwarding a page to be displayed to page (n+2), a diplayed area 192 is moved to the right. Then, since an overlap width y1 of the link area 194b linking to page (n+2) from page (n+1) and the link area 190b linking to page (n+1) from page n is greater than or equal to a width w of the diplayed area, a link to page (n+2) from page (n+1) is determined to be valid first, and page (n+2) becomes an active image by a linking process.

In contrast, when returning the page to be switched back to page n, the diplayed area 192 is moved to the left. Then, since an overlap width x of the link area 194a linking to page n from page (n+1) and the link area 190b linking to page (n+1) from page n is less than the width w of the diplayed area, a link to page (n+1) from page n is determined to be invalid first, and the n page becomes an active image by a switching-back process.

On the other hand, if page (n+1) becomes an active image by the link from page (n+2), the link areas 196a and 196b set for page (n+2) are subject to determination of link invalidity, and the link areas 194a and 194b set for page (n+1) are subject to determination of link validity.

When further forwarding the page to be displayed to page n, the diplayed area 192 is moved to the left. Then, since an overlap width y2 of the link area 194a linking to page n from page (n+1) and the link area 196a linking to page (n+1) from page (n+2) is greater than or equal to the width w of the diplayed area, a link to page n from page (n+1) is determined to be valid first, and page n becomes an active image by a linking process.

In contrast, when returning the page to be switched back to page (n+2), the diplayed area 192 is moved to the right. Then, since an overlap width x of the link area 196a linking to page (n+1) from page (n+2) and the link area 194b linking to page (n+2) from page (n+1) is less than the width w of the diplayed area, a link to page (n+1) from page (n+2) is determined to be invalid first, and page (n+2) becomes an active image by a switching-back process.

As described, by setting a link area for each page image in accordance with a rule where the width of an overlap of a link area set for a given page image to link to the subsequent page image and a link area set for the subsequent page image to link to the previous page image is made to be less than the width of a diplayed area, and where the width of an overlap of a link area set for the given page image to link to the subsequent page image and a link area set for the subsequent page image to link to a further subsequent page image is made to be greater than or equal to the width of the diplayed area, determination can be performed using the same process when displaying an image of a link destination and when switching back to an image of a link origin regardless of the direction, and the processing load can be reduced compared to a case where all images are switched by a linking process.

Figure 11:
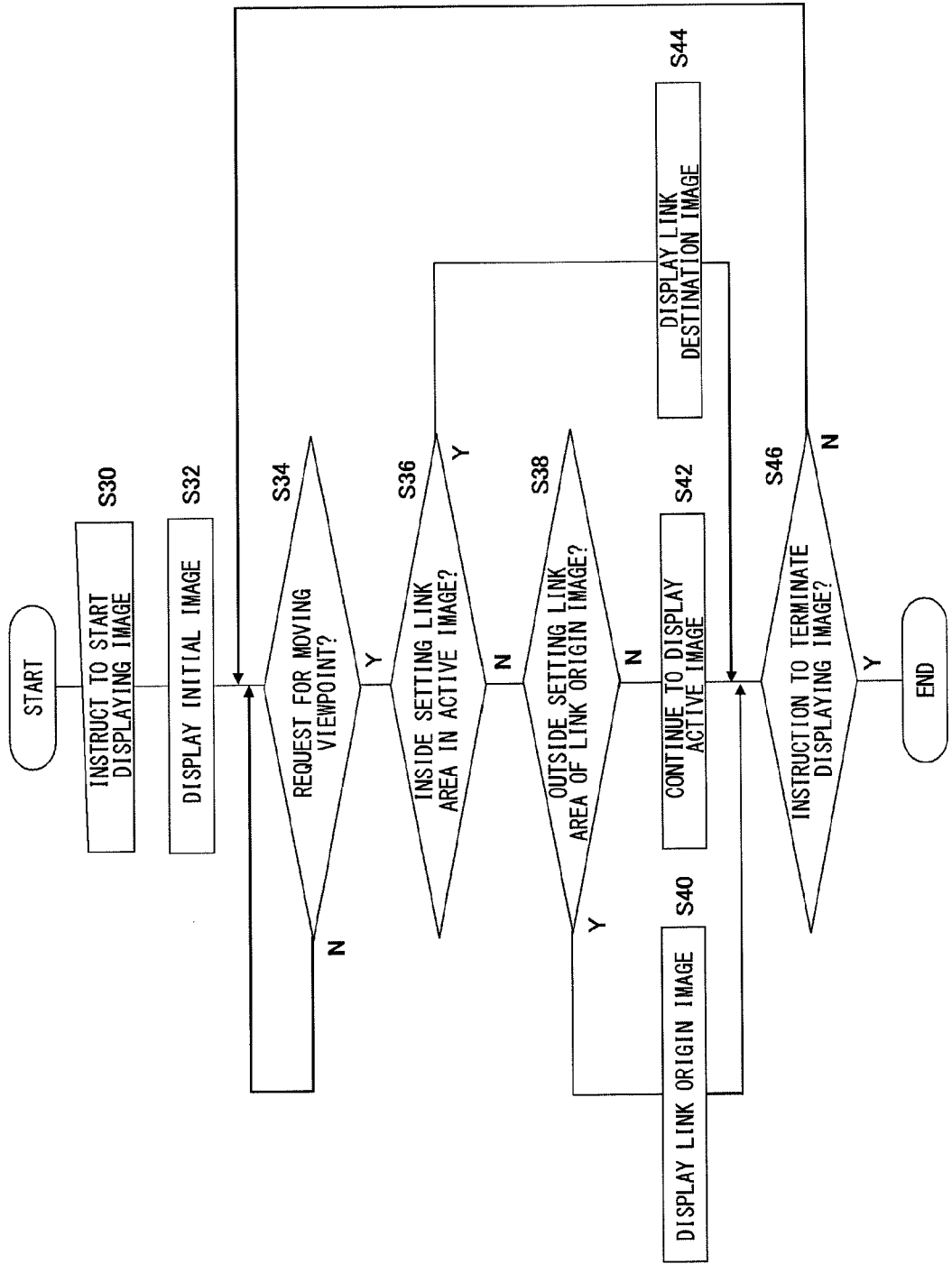
FIG. 11 is a flowchart illustrating a processing procedure for displaying an image for which a link is set in the present embodiment.

A detailed description will now be made of the operation of the image processing device 10 that are realized by the configurations described thus far. FIG. 11 is a flowchart illustrating a processing procedure for displaying an image for which a link is set, which is performed by the image processing device 10. A flowchart shown in FIG. 11 displays the processing procedure of components by a combination of a letter "S" (the initial of the word "Step"), which represents a step, and a number. When some sort of a determination process is performed by a process displayed by the combination of a letter "S" and a number, the processing sequence is displayed while adding a letter "Y" (the initial of the word "Yes") when the determination result is positive (e.g., Y in S10) and is displayed while adding a letter "N" (the initial of the word "No") when the determination result is negative (e.g., N in S10).

The flowchart shown in FIG. 11 begins when the user enters an instruction that indicates to start displaying an image via the input device 20. The user first instructs to start displaying an image by, e.g., specifying a file name of content (S30). In accordance with this, the loading unit 108, the decoding unit 112, the display image processing unit 114, and the like display an initial image after loading, decoding, and rendering the data of the initial image in corporation with one another (S32).

The image processing device 10 stays on stand-by until the user enters a request for moving a viewpoint by operating the input device 20 (N in S34). When a request for moving a viewpoint is entered (Y in S34), the link processing unit 116 keeps monitoring whether or not a diplayed area is encompassed in a link area that is set for an active image (S36). The active image is the initial image at this point. When the diplayed area is encompassed in the link area, the link processing unit 116 determines that the link is valid (Y in S36). And then, by acquiring identification information of an image of a link destination that is mapped to the link area, the image of the link destination is displayed after loading, decoding, and rendering processes (S44). The image displayed at this time becomes a new active image.

When the diplayed area is not encompassed in the link area (N in S36), the initial image is continued to be displayed while the diplayed area is moved within the initial image as an active image, according to the movement of the viewpoint (N in S38, S42). During a period when no instruction for terminating the display of the image is entered by the user, a request for moving the viewpoint is received (N in S46, S34). If the image of the link destination is displayed in S44, the image of the link destination is set to be an active image, and determination is made for a link set for the image.

Since an "image of a link origin" is generated at this point, the link processing unit 116 hereinafter monitors whether or not the diplayed area has moved outside of a link area that is set for the image of the link origin (S38). If even a part of the diplayed area moves outside of the link area, the link processing unit 116 determines that a corresponding link is invalid (Y in S38). And then, the display is switched back to the image of the link origin (S40). Hereinafter, determinations in S36 and S38 are conducted while an image to be displayed is set as an active image, and a display process is branched into any one of the steps S40, S42, and S44, until an instruction for terminating the display of the image is entered by the user. The display of the image is ended when an instruction for terminating the display is entered (Y in S46).

A description will now be given of an image processing device for creating content for realizing image display methods described thus far. The image processing device used in this case can be also used in the same environment as that of the image processing system 1 shown in FIG. 1, and the structure thereof is the same as that of the image processing device 10 shown in FIG. 3. A description will be given hereinafter regarding a control unit 100 of an image processing device 10 that has only these functions. Alternatively, the control unit 100 may be also provided with the functions of the control unit 100a shown in FIG. 7 at the same time.

FIG. 12 is illustrating a detailed configuration of a control unit of an image processing device 10 having a function of creating content that displays an image for which a link is set. A control unit 100b comprises an input information acquisition unit 210 for acquiring information entered by the user via the input device 20, a display image processing unit 212 for generating an image to be displayed for the user to specify information necessary for creating content, an image data generation unit 214 for generating a plurality of items of image data from an original electronic file subject to processing, a link adjustment unit 216 for adjusting a link area set by the user, and a content file output unit 218 for mapping image data to a link setting file and for outputting the image data and the link setting file as a content file.

The input information acquisition unit 210 acquires information entered via the input device 20 by the user such as a specification of a file name of a content file to be processed such as an electronic file of a book, etc., an indication for starting content generation, and the like. The input information acquisition unit 210 further acquires information necessary for creating content such as link settings, and the like that are entered by the user while viewing an input image displayed on the display device 12 by the display image processing unit 212 and the display processing unit 44.

The display image processing unit 212 performs a process for displaying an image of an original content file, an image generated in the middle of a process, or the like on the display device 12. A commonly-used technique can be used for the display of vector data of an electronic file of a book, etc., or a raster data image generated by converting the vector data. The display image processing unit 212 further allows the user to specify an image range by, e.g., displaying rectangles on each image. Further, the display image processing unit 212 may display a menu screen, a selection screen, a numerical value input screen, and the like. Such an image is displayed on the display device 12 by being rendered in the frame memory of the display processing unit 44.

The image data generation unit 214 reads out a specified content file of a book or the like from the hard disk drive 50. If an original image is composed of vector data, the original image is converted into raster data. In accordance with the specification of a range from the user, the individual image data is generated for each of a cover image, a contents image, respective page images included in text images and the like. Alternatively, the image data generation unit 214 may receive a division rule such as per-page division and generate the individual image data for each of those divided units in accordance with the division rule. Further, the image data generation unit 214 may generate hierarchical data by reducing the generated image data in a plurality of stages.

The link adjustment unit 216 sets a range specified by the user in each image generated by the image data generation unit 214 to be a link area and generates, for each item of data of each image, a link setting file mapping identification information of a link destination image specified in association with the link area to the information regarding the link area. As in the case of the text images 164 shown in FIG. 5, for displaying as a virtual array a plurality of images having information without hierarchy, an overlap width of a link area is adjusted in accordance with a rule such as the one explained in reference to FIG. 10 at this time. Alternatively, the user may specify a range of text images, and the link adjustment unit 216 itself may generate link areas and make an adjustment.

The content file output unit 218 puts together data mapping a link setting file generated by the link adjustment unit 216 to each item of image data generated by the image data generation unit 214 and stores the data as a content file in the hard disk drive 50. By such a configuration, a content file involving a switching of images such as the one described thus far can be easily generated in light of a demand of the user.

According to the present embodiment described thus far, content such as an electronic file of a book that is desired to be displayed is divided into a plurality of images for display. In this case, an association among images that shows a hierarchical structure or order of information in original content is expressed by a linking function. By dividing content based on subjects, pages, etc., loading and decoding of image data can be performed in units of the same size regardless of the size of the content. With this, content of a large data size can be easily displayed even in an image processing device or the like that displays still images.

Also, by dividing content into separate images, it is not necessary to recreate all data in order to replace or revise a part of the content, and time and effort required for an editing process can thus be reduced. Further, the properties of an image can be adjusted according to the contents such as changing a resolution for each page. For example, by setting only a given page to have hierarchical data, a variable range of a resolution can be locally changed.

Further, regarding images such as page images that have information without a hierarchical structure and whose permutation is defined, by setting a link area such that the link area overlaps the outer side of an image, a production effect can be realized that looks as if there exists a subsequent image in the direction thereof. In such images, it is highly likely that images will be switched back and forth just like turning pages back and forth. At this time, a link area of each image is adjusted and set such that an overlap of link areas set for images adjacent to each other in a virtual image sequence follows a predetermined rule.

By continuing to monitor the validity of a link to an image that is currently subject to display, a time is acquired at which the link, which is valid at this point, becomes invalid. By such a configuration, a process can be performed while a distinguishing switching-back process of switching back to a previous display target from normal linking even if the user does not change an operation method. In comparison to a linking process, a load is lighter in a switching-back process of switching back to a previous display target, and, for example, an immediately previous image can be instantly displayed by keeping the data of the last image stored in a buffer memory or the like. Thus, a switching speed can be improved. Differentiation of such processes can be easily realized only by setting a link area and extending timing for link determination.

Also, by recording only a switching of an image by the linking process as a display history, a history of a switching of an image by the switching-back process such as turning the same pages back and forth is excluded from being recoded. Therefore, when an undo process is performed based on the display history, a path for the switching of the image, which is meaningful as a history, can be traced back. Also, depending on the capacity of a memory area for storing a history, a possibility for losing a necessary history becomes low.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

For example, a case where images are virtually arranged in a one-dimensional space in the horizontal direction is mainly described in the present embodiment. Alternatively, images can be arranged in a two-dimensional space by providing link areas on the top and bottom of each image. In this case, by applying, in two directions, a rule described in the present embodiment that is related to an overlap width of links that are set for images adjacent to each other, a linking process and a switching-back process can be separated inside the device, and the efficiency of a display process can be increased.

In the present embodiment, the switching-back process of switching back a display image is performed by determining the invalidity of a link set for an image that was an active image just before. Alternatively, a link set for an image that was an active image two or more active images before may be further stored. In this case, after a process of switching back to the previous image, for example, a process of switching further back to the more previous image can be possible.

What is claimed is:

1. An image processing device to display an image with moving a displayed area in the image according to user operation, comprising:
   a content memory unit configured to store data of a plurality of images to be displayed and a link setting file that is respectively set for each image to achieve a link function of switching display of a single image being displayed to another image when an inclusion relationship between the displayed area and a specific link area satisfies a predetermined requirement, the link setting file describing information regarding the link area and identification information of a link destination image;
   a link processing unit configured to determine whether an inclusion relationship with a link area set for a current image being displayed satisfies the predetermined requirement by a movement of the displayed area in the current image; and
   a display image processing unit configured to switch an image to be displayed to the link destination image by performing a rendering process of rendering image data of the link destination image based on the identification information of the link destination image when it is determined by the link processing unit that the predetermined requirement has been satisfied,
   wherein the link processing unit further continues to monitor an inclusion relationship between a link area that is set for an image displayed before a switching to the image being displayed and the displayed area in the image being displayed to determine whether the inclusion relationship no longer satisfies the predetermined requirement, and wherein the display image processing unit further switches the image to be displayed back to the image displayed before the switching when the link processing unit determines that the predetermined requirement is no longer satisfied.

2. The image processing device according to claim 1, wherein, in the link setting file, two link areas are set to include respective areas outside two opposite sides of four sides of each rectangular image and to link to different destination images, and wherein the display image processing unit expresses a virtual array of the plurality of images concatenated by a link by switching an image to be displayed to a link destination image when it is determined that the predetermined requirement has been satisfied by a movement of the displayed area toward either one of the two sides of the image being displayed.

3. The image processing device according to claim 2, wherein a condition where the displayed area is encompassed in the link area is set to be the predetermined requirement, wherein link areas of each image are set such that an area in which a link area that is set to a first image and that links to a second image and a link area that is set to the second image and that links to the first image overlap with each other is set to be a size that does not allow the displayed area to be encompassed while the first image and the second image are arranged one after the other in the virtual sequence, and wherein the link processing unit determines that an inclusion relationship between the link area linking to the second image, which is the image being displayed, and the displayed area no longer satisfies the predetermine condition before the link processing unit determines that an inclusion relationship between the link area linking to the first image, which is the image displayed before the switching, and the displayed area satisfies the predetermine condition.

4. The image processing device according to claim 2, wherein a condition where the displayed area is encompassed in the link area is set to be the predetermined requirement, wherein link areas of each image are set such that an area in which a link area that is set to a third image and that links to a second image and a link area that is set to the second image and that links to a third image overlap with each other is set to be a size that allows the displayed area to be encompassed while the first image, the second image, and the third image are successively arranged in the virtual sequence, wherein the link processing unit determines that an inclusion relationship between the link area linking to the third image that is set to the second image, which is the image being displayed, and the displayed area satisfies the predetermine condition before the link processing unit determines that an inclusion relationship between the link area linking to the second image, which is the image being displayed, and the displayed area no longer satisfies the predetermine condition.

5. The image processing device according to claim 1, wherein the link processing unit records identification information of a corresponding link destination image as a display history when the inclusion relationship between the link area set for the image being displayed and the displayed area is determined to satisfy the predetermined condition, and wherein the display image processing unit acquires identification information of the link destination image recorded in the display history in reverse order from the order of recording each time a user enters an undo operation and switches the display image to the link destination image having the identification information.

6. The image processing device according to claim 2, wherein the display image processing unit displays the link destination image when the inclusion relationship is determined to satisfy the predetermined condition by a movement of the displayed area and expresses the virtual array by continuously displaying a part of the image of a link origin included in a frame.

7. The image processing device according to claim 1, wherein the data of the plurality of images stored by the content memory unit includes both data expressing a single image in a single resolution and data having a hierarchical structure obtained by hierarchizing data expressing a single image in a plurality of resolutions.

8. A content creation device comprising:
an image data generation unit configured to generate a plurality of items of image data;
a link adjustment unit configured to adjust and set a specific link area for each image to achieve a link function of switching display of a single image being displayed to another image, in an image processing device for display an image with moving a displayed area in the image according to user operation when the displayed area is encompassed in the specific link area, such that an area in which a link area that is set to a first image and that links to a second image and a link area that is set to the second image and that links to the first image overlap with each other is set to be a size that does not allow the displayed area to be encompassed, while the first image and the second image are arranged one after the other in a virtual sequence of images expressed by a link; and
a content file output unit configured to output a content file that maps the image data to a link setting file in which information regarding the link area and identification information of a link destination image are described.

9. The content creation device according to claim 8, wherein the link adjustment unit adjusts and sets the link area such that an area in which a link area that is set to a first image and that links to a second image and a link area that is set to the second image and that links to a third image overlap with each other is set to be a size that allows the displayed area to be encompassed while the first image, the second image, and the third image are successively arranged in the virtual sequence.

10. An image processing method to display an image with moving displayed area in the image according to user operation, comprising:
reading out, from a memory device, a content file that maps data of a plurality of images to be displayed to a link setting file that is set for each image to achieve a link function of switching display of a single image being displayed to another image when an inclusion relationship between the displayed area and a specific link area satisfies a predetermined requirement, the link setting file describing information regarding the link area and identification information of a link destination image;
switching, when an inclusion relationship with a link area set for a current image being displayed satisfies the predetermined requirement by a movement of the displayed area in the current image, an image to be displayed to a link destination image by performing a rendering process of rendering image data of the link destination image based on the identification information of the link destination image; and continuing to monitor an inclusion relationship between a link area that is set for an image displayed before a switching to the image being displayed and the displayed area in the image being displayed and switching back to the image displayed before the switching when the inclusion relationship no longer satisfies the predetermined requirement.

11. A computer program product embedded in a non-transitory computer readable recording medium, comprising:
   a module configured to display an image with moving a displayed area in the image according to user operation;
   a module configured to read out, from a memory device, a content file that maps data of a plurality of images to be displayed to a link setting file that is set for each image to achieve a link function of switching display of a single image being displayed to another image when an inclusion relationship between the displayed area and a specific link area satisfies a predetermined requirement, the link setting file describing information regarding the link area and identification information of a link destination image;
   a module configured to switch, when an inclusion relationship with a link area set for a current image being displayed satisfies the predetermined requirement by a movement of the displayed area in the current image, an image to be displayed to a link destination image by performing a rendering process of rendering image data of the link destination image based on the identification information of the link destination image; and
   a module configured to continue to monitor an inclusion relationship between a link area that is set for an image displayed before a switching to the image being displayed and the displayed area in the image being displayed and switching back to the image displayed before the switching when the inclusion relationship no longer satisfies the predetermined requirement.

12. A non-transitory computer-readable recording medium having embodied thereon a computer program product comprising:
   a module configured to display an image with moving a displayed area in the image according to user operation;
   a module configured to read out, from a memory device, a content file that maps data of a plurality of images to be displayed to a link setting file that is set for each image to achieve a link function of switching display of a single image being displayed to another image when an inclusion relationship between the displayed area and a specific link area satisfies a predetermined requirement, the link setting file describing information regarding the link area and identification information of a link destination image;
   a module configured to switch, when an inclusion relationship with a link area set for a current image being displayed satisfies the predetermined requirement by a movement of the displayed area in the current image, an image to be displayed to a link destination image by performing a rendering process of rendering image data of the link destination image based on the identification information of the link destination image; and
   a module configured to continue to monitor an inclusion relationship between a link area that is set for an image displayed before a switching to the image being displayed and the displayed area in the image being displayed and switching back to the image displayed before the switching when the inclusion relationship no longer satisfies the predetermined requirement.

13. A non-transitory computer-readable recording medium having embodied thereon a content file processed in an image processing device to display an image with moving displayed area in the image according to user operation, wherein the content file has a data structure mapping the following to each other:
   data of a plurality of images to be displayed; and
   a link setting file describing a link area and identification information of a link destination image,
   where the link area is a specific link area set for each image to achieve a link function of switching display of a single image being displayed to another image when a displayed area is encompassed in the specific link area; and
   wherein the link area is set such that an area in which a link area that is set to a first image and that links to a second image and a link area that is set to the second image and that links to the first image overlap with each other is set to be a size that does not allow the displayed area to be encompassed, while the first image and the second image are arranged one after the other in a virtual sequence of images expressed by a link.

14. The non-transitory computer-readable recording medium according to claim 13, wherein the link area is set such that an area in which a link area that is set to third image and that links to a second image and a link area that is set to the second image and that links to a third image overlap with each other is set to be a size that allows the displayed area to be encompassed while the first image, the second image, and the third image are successively arranged in the virtual sequence.

* * * * *